Figure 1:
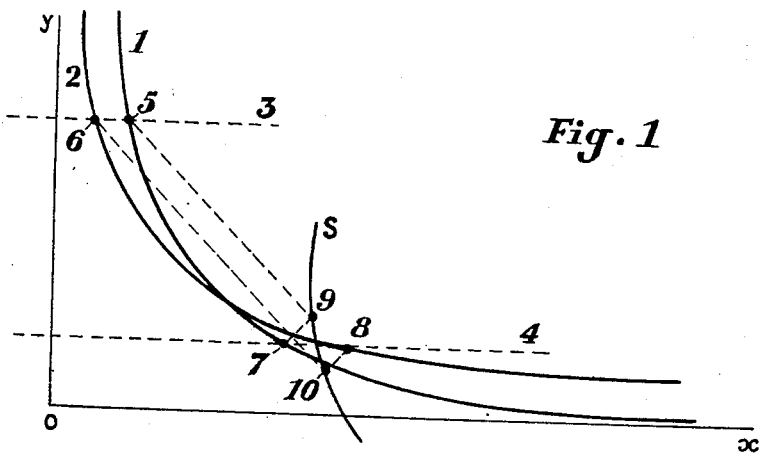

Dec. 12, 1950  R. P. LEROY  2,533,594
DEVICE FOR STUDYING THE CHARACTERISTICS
OF A PHENOMENON
Filed Aug. 5, 1947  3 Sheets-Sheet 1

INVENTOR:
ROBERT P. LEROY
BY HIS ATTORNEYS:
Baldwin, Wight, & Prevost

Dec. 12, 1950 R. P. LEROY 2,533,594
DEVICE FOR STUDYING THE CHARACTERISTICS
OF A PHENOMENON
Filed Aug. 5, 1947 3 Sheets-Sheet 2

INVENTOR:
ROBERT P. LEROY
BY HIS ATTORNEYS:
Baldwin, Wight & Prevost

Dec. 12, 1950 R. P. LEROY 2,533,594
DEVICE FOR STUDYING THE CHARACTERISTICS
OF A PHENOMENON
Filed Aug. 5, 1947 3 Sheets-Sheet 3

INVENTOR:
ROBERT P. LEROY
BY HIS ATTORNEYS:
Baldwin, Wight, & Prevost

Patented Dec. 12, 1950

2,533,594

UNITED STATES PATENT OFFICE 2,533,594

DEVICE FOR STUDYING THE CHARACTERISTICS OF A PHENOMENON

Robert P. Leroy, Paris, France, assignor to Centre National de la Recherche Scientifique, Paris, France, an organized public establishment of France Application August 5, 1947, Serial No. 766,266
In France August 5, 1946

5 Claims. (Cl. 346—33)

1

To study a phenomenon or to ascertain the value of some symbols one often has to trace or to make a record of a curve. The characteristics of this curve may themselves be related with a variable in such a way that a whole family of curves of the same type is obtained, by instance: a family of straight lines, a family of exponential curves, a. s. o. The recording of this whole set of curves is intricate and the analysis of the results is a tedious matter.

This invention has for its object a method and a device conferring a very great simplification in this field. It may be applied to the cases when the curve is entirely defined by the knowledge of two parameters. These two parameters may be parameters of shape or a shape and a position parameter or, in general, any two parameters.

The invention is based on the following considerations:

The position of a point in a plane is a function of two parameters or coordinates (rectangular, polar, a. s. o.). When a curve is entirely defined with the knowledge of two variables only it is possible to ascertain all the characteristics of this curve by the position of a point on a plane. A connection between a curve of a given family and a representative point in a plane is, thus, established. To each curve corresponds a point and reciprocally. It is, then, useless to construct the curve, it is enough to know the co-ordinates of the point.

This case is frequently encountered when studying phenomena which may be represented, either by a curve of the first degree, with respect to which it is sufficient to know the point where it crosses an axis, and the slope, either by a curve of the second degree made to pass by a known origin or to be asymptotic to a known axis, either by an exponential curve asymptotic to two known axes, either, still, by a sine curve or by bell shaped curves such as resonance curves. In all these cases, the representation of the phenomenon and of its variations as a function of a factor may be more clearly expressed and understood by the movement, on a chart, of a point representing the characteristics of the curve, than by the curve itself. This invention has for its objects methods and means which permit, either to pass directly from the curve, defined in any manner, to the recording of the representative point, either to directly trace the representative point without drawing a useless curve inasmuch as its law is known. According to this invention, these results are obtained in determining, by a graphical or physical method, either two axes the respective

2 intersecting points of which in crossing the curve supply the co-ordinates of the looked for point, either a single axis (in the case of a resonance curve, for instance) which crosses the curve at two points thus supplying the co-ordinates of the looked for point.

It is possible to represent by a single point on a chart the bell-shaped resonance curve of an oscillating circuit. It is known that when capacity is introduced in an oscillating circuit, the bell shaped resonance curve obtained by acting on a variable capacity introduced in said circuit is a curve of a known family; according to the present invention, said curve may be represented by a single point on a chart. It is thus possible to identify by the position of the point obtained on the chart the value of an unknown capacity introduced in the oscillating circuit.

Moreover, the dielectrical properties of substances vary according to their moistness or other physical properties. In using said substances as dielectrical medium in a capacity it is possible to study their moistness degree.

Fig. 1 shows, by way of example, two exponential curves 1 and 2, both asymptotic to the axis Ox, Oy. They are crossed by two axes 3, 4, chosen so as to have, each, only one intersecting point with each of them. Let 5, 6, 7, 8 be the intersecting points. It is obvious that the inclined co-ordinates 9—5, 9—7, establish the position of a point 9 depending on the characteristics of the exponential curve 1. The sloping co-ordinates 10—6, 10—8, establish the position of a point 10, related with the characteristics of the exponential curve 2.

Where a network of $n$ exponential curves exists, said curves being obtained in successively varying a given factor, this network shall be more clearly represented by the curve S, locus of the points 9, 10, than by the whole of the exponential curves.

In the case of a bell shaped curve such as a resonance curve, a single axis crossing the bell at two points may be substituted to the two axes 3 and 4.

Figure 2:
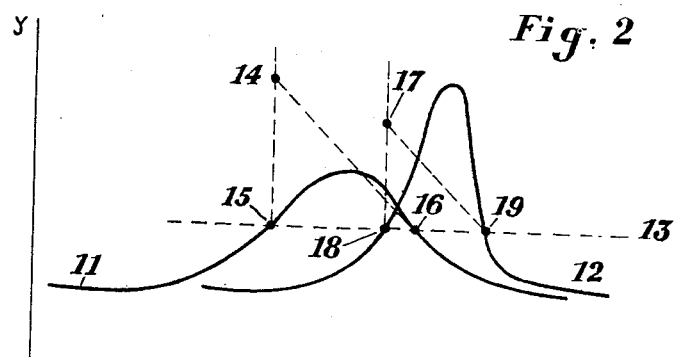

Fig. 2 shows two resonance curves 11, 12, intersected by the axis 13. The inclined co-ordinates 14—15, 14—16, define a point 14 characterizing the curve 11. The two co-ordinates 17—18, 17—19, determine a point 17 characterizing the curve 12.

It is easily seen that the positions of 14 and 17 shall be much more accurately determined than the peaks of the curves 11 and 12 which are usually taken as reference points, the accurate position of the peaks being rather difficult to ascertain, while the position of points 15, 16, 18, 19 is devoid from any cause of error.

Though, in the above mentioned examples, one has taken under consideration the tracing of the curves in rectangular co-ordinates, it is obvious that the same method may be used for curves traced according to polar co-ordinates.

The invention has for its object any device permitting to record the position of a point characterizing a curve defined by two parameters. It has more particularly in view the direct recording of the position of the point characterizing a curve when the latter is expressed by the variation of an electrical symbol (current, voltage, power a. s. o.) which depends on the variation of an electrical parameter (variation of a resistance, of the capacity of a condenser, of an air gap, a. s. o.). According to an embodiment of the invention, the device comprises two relays responding to the electrical quantity and adjusted for two values of this quantity. When, owing to the variation of the electrical parameter, the said quantity reaches the value of the adjustment of the first relay, this latter operates a recording system which traces an axis on a recording paper.

This paper is placed on a table which moves in front of the recording systems of the relays. This motion is commanded by the member which induces the variation of the parameter.

When the electrical quantity attains the adjustment value of the second relay, this latter shall achieve the tracing of another axis. This axis makes a predetermined angle with respect to the first axis. Their intersection shall determine the point characterizing the curve.

Figure 3:
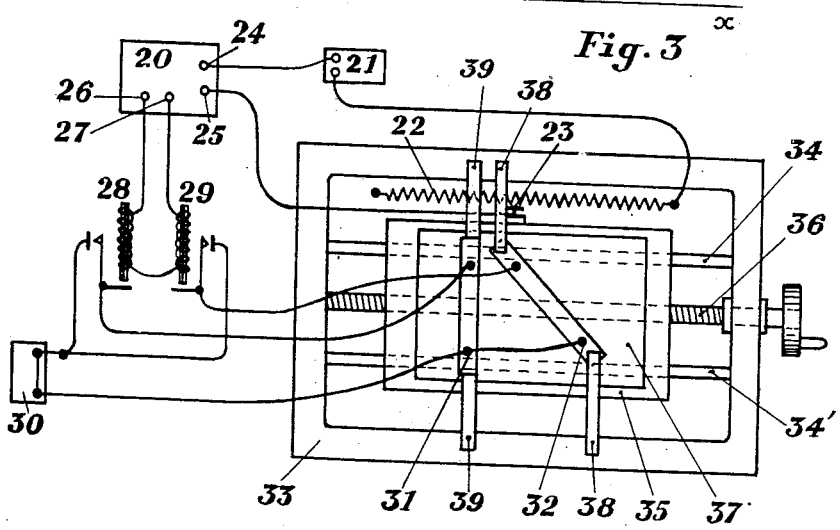

Fig. 3 shows diagrammatically, by way of example, a device according to this invention.

Referring to Fig. 3 reference character, 20 designates an apparatus used to study a substance in which a parameter measured by electrical means is related with the intensity of an electrical current. This current originates from a source 21 and its intensity is regulated by a resistor 22 upon which glides the sliding contact 23. The current reaches the apparatus 20 through terminals 24 and 25. From terminals 26 and 27 of this apparatus a current flows in the two relays 28 and 29 adjusted for two different intensities. The relays 28 and 29 control a source of current 30 which actuates two recorders 31 and 32 which may be of any suitable type, made of, for instance, electro-magnets actuating a striking blade. These recorders are mounted on a fixed frame 33. They are placed under an angle of, for instance, 45 degrees. This same frame is provided with two slides 34, 34' which permit the movement of a carriage 35 through a threaded rod 36. The glider 23 of the resistor 22 is fastened to this carriage. The carriage is also provided with a paper 37 mounted to receive the markings of the recorders, that stays 38 and 39 bind to the frame 33.

The operation proceeds as follows: When the carriage 35 is moved in actuating the screw 36, the glider 23 and the paper 37 move in a strict synchronous manner. If the carriage which was, at first, on the left side is moved towards the right side, it can be noticed that the current acting on the apparatus 20 increases as the carriage is moved. For a particular value of this current the relay 28 is actuated by the current in relationship with the studied parameter and a record is made by the marker 31, on the paper, which is, at this moment, in a determined position, depending on the intensity of the current reaching 20 through terminals 24, 25. When the carriage occupies another position, the current originating from the terminals 26, 27 reach the necessary value to actuate in its turn the relay 29 and the marker 32 traces on the paper 37 an oblique line, the position of which depends on the position of the carriage, that is to say of the value of the current acting on the apparatus 20. The lines traced by the two markers, under an angle, cross themselves in a point. It is obvious that the position of this point is determined by the law of variation of the current emitted by the apparatus 20 in relationship with the current that it receives from the source 21. The position of this point may thus be used to represent this law of variation.

Each marking system consists in a corner plate like member maintained in a raised position by a spring, which strikes the recording paper.

Figure 4:
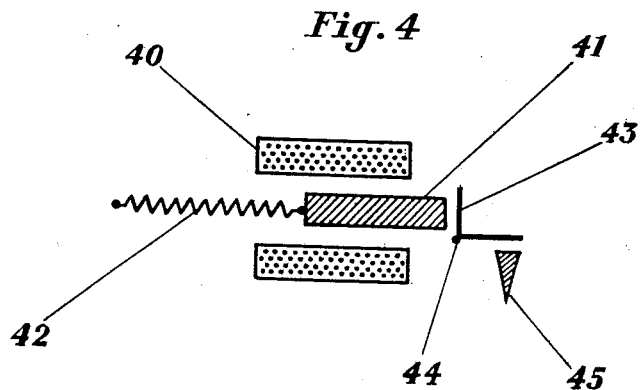

An embodiment of such a device is given, by way of example, in Figure 4. Referring to Figure 4, 40 is the winding of an electro-magnet; 41 is the core of this electro-magnet biased to the left by the spring 42 when no current flows into the winding 40; 43 designates an armature and striker arm extending normal thereto and pivotally mounted on an axis 44 and wherein the striker arm which is adapted to strike the marking blade 45. When the current flows in the winding 40, following the operation of one of the relays 28 or 29, the core 41 is vigorously attracted, and overreaching its position of equilibrium, as shown in Fig. 4, strikes in its turn the blade 45. After the percussion on 45, the core 41 retains its position of equilibrium and the blade 45 is upraised by the action of a spring, not shown.

The strikers of the marking system are positioned according to an angle, preferably a 45° angle. This angle may be made adjustable according to the requirements. To this end, one of the assemblages—"relays-marking system"—may be rotated about an axis which is perpendicular to the plane of the table. The meeting point of the two axes traced by the marking systems shall be the point characterizing the curve.

It is obvious that the marking may be made with a single striker which may be moved from position 31 to position 38 (Fig. 3) when the carriage reaches the end of its stroke, on the right side, and which may be inversely moved when said carriage reaches the end of its stroke, on the left side.

It is possible to trace in advance on the recording paper, under the form of a chart, the network of the loci of the points characterizing the curves of a same family, obtained in varying one of the factors which enter into the mathematical expression of the said curves. An improvement to the preceding system consists in providing, instead of one chart only, several charts each established for one of the conditions, which may be intricate, in which the measurements must be made.

Figure 5:
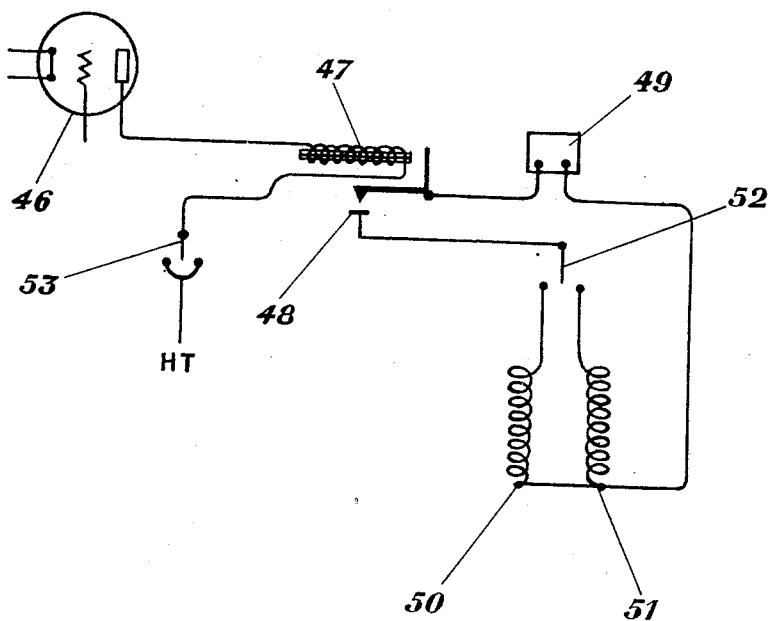

Fig. 5 is a schematic view of the connections used in a device similar to the former one, but used to record the position of a point characterizing a resonance curve.

In this case, the variable electrical parameter may be the capacity of a condenser placed in a known manner in a resonant circuit; the electrical entity representing the resonance curve may be advantageously the plate current of an oscillating tube. Under these conditions, if one considers, for instance, curve 11 of Fig. 2, the first record must be made when, owing to the variation of the capacity of the condenser, the plate current value reaches the value represented by the axis 13. The marking system cooperating with the relay traces, then, the line 14—15. The second record must be made when the plate current, after reaching its maximum value (resonance) drops to the value represented by the axis 13; it produces, then, the tracing of the line 14—16. A particular arrangement, which is part of this invention, is used, in the previously described device, in order to permit, at first, the operation of the first marker only, then the operation of the second marker, and this with a single relay, only after the passage at the resonance point.

To this end, the resonance curve is traced, once, in the direction of the increasing capacities, and once into that of the decreasing capacities, the carriage being moved, for instance, from left to right for the first measurement and inversely for the second measurement.

Figure 5 shows the device which is substituted for the relays 28 and 29 of Fig. 3 to operate the marking devices; 46 represents a tube, the plate circuit of which is connected to the relay 47. The contact 48 of this relay sends the current originating from a source 49 to the marking devices 50 and 51. A change-over switch 52 actuated by the movement of the carriage (shown at 25 in Fig. 3) permits making the current of the source 49 flow into one or the other of the devices 50 and 51 according to the direction of the motion of the said carriage. A device 53 actuated simultaneously with the change-over switch 52 cuts the plate current of the tube 46 during the time of the change-over so as to reestablish the relay 47 in its "off" position.

A particularly valuable application of the process hereabove described and of the devices shown is the determination of the moistness of substances such as, by instance, wood, butter, seeds and so on and that owing to the great difference between the dielectric power of water and that of proteidic substances hereabove mentioned; in the dry state.

Figure 6:
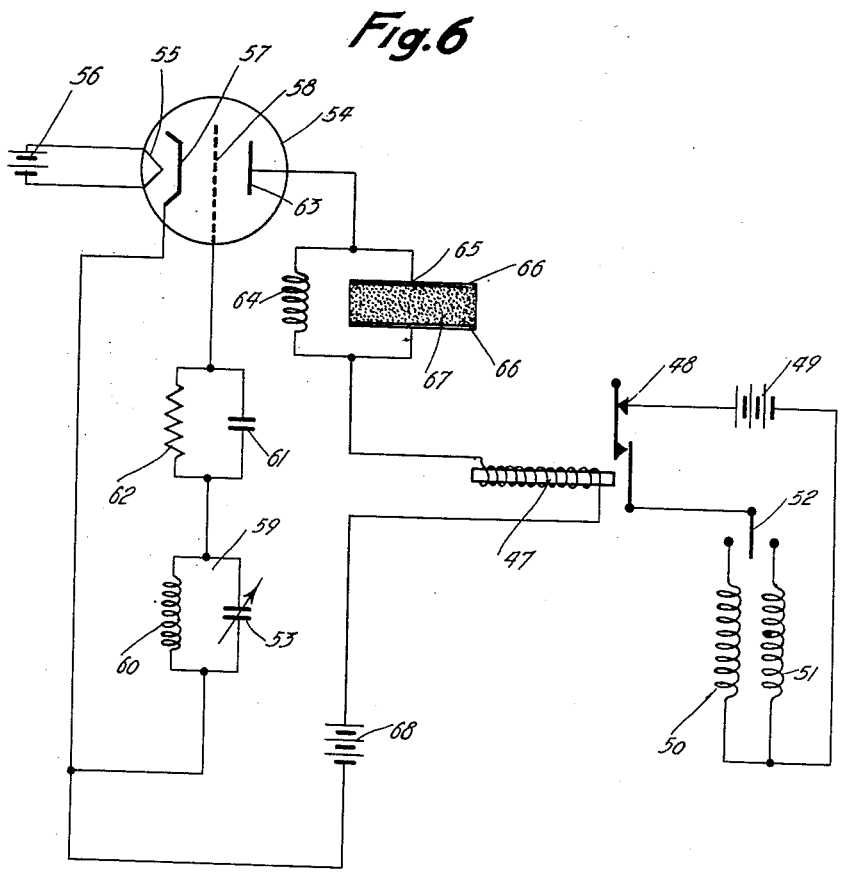

In order to determine the water contents of seeds and particularly wheat, it is possible to use the electric appliance shown in Fig. 6, operating a device such as hereabove described.

The oscillating circuit comprises an electronic tube 54 with a heating filament 55, fed by a battery 56, a cathode 57 and a grid 58, between which is mounted a grid oscillating circuit 59, comprising a variable condenser 53 and an inductor 60 in parallel, and a detector, comprising a condenser 61 and a resistor 62 in parallel, a plate 63, said plate being connected to a circuit comprising a plate oscillating circuit with an inductor 64 and a condenser 65 in parallel, said condenser 65 being formed of two plates 66 between which the substance 67 to be studied can be placed, a relay 47 and a battery 68. The relay 47 operates a device such as hereinbefore described.

The use of said device is as follows. The space between plates 66 is formerly filled with a well determined quantity of dry wheat. The table is displaced from one side to another of the frame and back to its departure position; a point 37 on the graph of Figure 2 is so obtained.

An equal quantity of wheat to be studied is then substituted to the dry wheat. The dielectric characteristic of the condenser and the resonance curve of the plate oscillating circuit are modified and a point such as 38 is obtained on the same graph. The displacement of the representative point allows to determine the water contents of the studied wheat. It is possible to use paper graph formerly graduated, for instance from samples having a known moistness. A mere reading gives the water contents.

Although two embodiments of the invention have been described, it is obvious that one does not wish to limit oneself to these particular embodiments released only by way of examples and without any restricting character, and that, accordingly, all the alternatives based on the same principle and with the same object in view shall be included under the scope of this invention as the previously mentioned arrangements.

What I claim is:

1. In a device for measuring the unknown value of a physical entity capable of being a variable in an electric circuit and modifying the curve of variation of a characteristic of the current in said circuit when another variable of said electric circuit varies, an electric circuit, a variable element in said circuit, means to insert in said circuit the physical entity to be measured, means to vary the variable element in said circuit, detecting means inserted in said circuit, and capable of detecting predetermined values of the hereinbefore mentioned characteristic of the current, a table of reference, two marking devices coacting with said table and constituted by a marking blade, both blades having different angular directions relative to the table, means for giving a relative displacement to the table and the marking devices according to the variation of the variable element in the circuit, and means controlling the marking devices and controlled by said detecting means.

2. In a device for measuring the unknown value of a physical entity capable of being a variable in an electric circuit and modifying the curve of variation of a characteristic of the current in said circuit when another variable of said electric circuit varies, an electric circuit, a variable element in said circuit, means to insert in said circuit the physical entity to be measured, means to vary the variable element in said circuit, a relay inserted in said circuit and operating for predetermined values of the hereinbefore mentioned characteristic of the current, a table of reference, two marking devices coacting with said table and constituted by a marking blade, both blades having different angular directions relative to the table, means for giving a relative displacement to the table and the marking devices according to the variation of the variable element in the circuit, and two electromagnets each controlling a marking device and controlled by the hereinbefore mentioned relay.

3. In a device for measuring the unknown value of a physical entity capable of being a variable in an electric circuit and modifying the curve of variation of a characteristic of the current in said circuit when another variable of said electric circuit varies, an electric circuit, a variable element in said circuit, means for including in said circuit the physical entity to be measured, means for varying the variable element in said circuit, detecting means connected in said circuit and capable of detecting predetermined values of the hereinbefore mentioned characteristic of the current, a table of reference, marking means constituted by a marking blade controlled by an electromagnet controlled by the hereinbefore mentioned detecting means, said marking blade being angularly displaceable with respect to said table, and means for longitudinally displacing said table relative to said marking blade.

4. A device for measuring the value of a capacity, comprising an oscillating circuit with a variable condenser and a relay connected therein and acting for a determined value of the current in said oscillating circuit, means for including in said oscillating circuit the capacity, the value of which is to be measured, an auxiliary circuit comprising a switch controlled by the hereinbefore mentioned relay, two electromagnets contact means for alternatively inserting said electromagnets in the auxiliary circuit, a recording device comprising a table of reference, two strikers constituted by a marking blade and actuated each by one of said electromagnets, means for displacing the table of reference relatively to the strikers, and means for operating said contact means when the relative displacement of the table of reference and the strikers is a maximum in each direction.

5. A device for measuring the degree of moisture of a determined substance comprising an oscillating circuit including a variable condenser, a relay operative under conditions of a determined value of the current in said oscillating circuit and two plates forming a condenser connected in said circuit, said plates being spacially positioned for receiving therebetween the substance the moisture of which is to be measured, an auxiliary circuit comprising a switch controlled by said relay, two electromagnets, contact means for alternatively connecting said electromagnets in said auxiliary circuit, a recording device comprising a table of reference, two strikers constituted by a marking blade and actuated each by one of said electromagnets, means for displacing the table of reference relatively to the strikers, and means for actuating said contact means for said electromagnets when the relative displacement of the table of reference and strikers is a maximum in each direction.

ROBERT P. LEROY.

REFERENCES CITED

The following references are of record in the file of this patent:

UNITED STATES PATENTS

| Number | Name | Date |
|---|---|---|
| 1,841,558 | Vehling | Jan. 19, 1932 |
| 2,186,922 | Hampton et al. | Jan. 9, 1940 |
| 2,224,182 | Crooke | Dec. 10, 1940 |
| 2,365,949 | Greene | Dec. 26, 1944 |
| 2,401,019 | Rieber | May 28, 1946 |
| 2,412,234 | Turner, Jr. | Dec. 10, 1946 |
| 2,415,880 | Hassler | Feb. 18, 1947 |

FOREIGN PATENTS

| Number | Country | Date |
|---|---|---|
| 221,077 | Great Britain | Sept. 4, 1924 |